United States Patent [19]
Tagami

[11] Patent Number: 5,622,373
[45] Date of Patent: Apr. 22, 1997

[54] CHUCKING DEVICE

[76] Inventor: Tetsuro Tagami, 1976-1, Yanokuchi, Inagi-shi, Tokyo-to, Japan

[21] Appl. No.: 424,431

[22] PCT Filed: Sep. 2, 1994

[86] PCT No.: PCT/JP94/01451

§ 371 Date: May 1, 1995

§ 102(e) Date: May 1, 1995

[30] Foreign Application Priority Data

Sep. 7, 1993 [JP] Japan ..................... 5-222511

[51] Int. Cl.⁶ .................................................. B23B 31/20
[52] U.S. Cl. ........................... 279/52; 279/53; 409/234
[58] Field of Search ................. 279/51–53; 408/239 R, 408/239 A, 246; 409/232, 234

[56] References Cited

U.S. PATENT DOCUMENTS

| | | | |
|---|---|---|---|
| 3,685,845 | 8/1972 | Fischer et al. | 279/5 |
| 4,865,336 | 9/1989 | Keritsis | 279/103 |
| 5,123,663 | 6/1992 | Mizoguchi | 279/46.3 |

FOREIGN PATENT DOCUMENTS

| | | |
|---|---|---|
| 1-35765 | 11/1989 | Japan . |
| 3-79128 | 12/1991 | Japan . |

*Primary Examiner*—Steven C. Bishop
*Attorney, Agent, or Firm*—Ladas & Parry

[57] ABSTRACT

A chucking barrel is connected to a holder capable of being fitted into a rotation spindle of a machine tool. A plurality of axially extending projections are disposed in equally spaced relationship as viewed in the circumferential direction on the connection surface side of the holder, and a plurality of opening portions are formed between adjacent projections. A plurality of teeth-like projections, capable of being fitted in the opening portions, are radially formed on a driving annular member, and a plurality of male threads are formed on the outer surface of the tooth-like projections so as to allow the driving annular member to be displaced in the axial direction. A tightening ring has a plurality of female threads threadably engageable with a plurality of male threads on the driving annular member formed on an inner hole surface thereof, and the tightening ring is rotatably held on the outer peripheral surface of the chucking barrel. A press-fitting member fitted to a tapered hole of the chucking barrel is fixedly secured to the driving annular member. As the tightening ring is rotated, the driving annular member is displaced in the axial direction, causing the press fitting member to be displaced, whereby the diameter of the press-fitting member is reduced by a tapered surface of the chucking barrel to firmly hold a shank of a cutting tool in the tightened state.

10 Claims, 9 Drawing Sheets ns formed to be fitted into the opening portions of the chucking barrel and having a plurality of male threads formed on the outer peripheral surface thereof; a tightening ring having a plurality of female threads threadably engageable with the male threads of the driving annular member formed on the inner hole surface thereof, the tightening ring being rotatably held on the outer peripheral surface of the chucking barrel; and a press-fitting member fixedly secured to the driving annular member and adapted to be fitted into the tapered hole of the chucking barrel.

CHUCKING DEVICE

TECHNICAL FIELD

The present invention relates to a chucking device, and more particularly to a chucking device for holding a cutting tool such as a drill, an end mill or the like.

BACKGROUND ART

Generally, a cutting tool such as a drill, an end mill or the like is fitted to a rotation spindle of a machine tool by using a chucking device. FIG. 14 shows by way of example a conventional chucking device of the foregoing type, and the chucking device 1 consists of a main body 2, a cylindrical press-fitting member 3 and a tightening ring 4. A plurality of male threads 6a are formed on the outer peripheral surface of a fore end part 5 of the chucking device 1, and a tapered hole 6b whose inner diameter is enlarged toward the foremost end thereof is formed inside of the fore end part 5.

A tapered portion 3a capable of being fitted to the tapered hole 6b is formed on the outer peripheral surface of the press-fitting portion 3. On the other hand, a hole 3b adapted to be fitted onto a shank of a cutting tool 7 is formed on the inner peripheral surface of the press-fitting portion 3.

A plurality of female threads 8 capable of being threadably engaged with the male threads 6a of the chucking device 1 are formed on the inner peripheral surface of the tightening ring 4, and a plurality of balls 9 are disposed on a fitting surface to the press-fitting member 3.

With the chucking device 1 constructed in the above-described manner, when the tightening ring 4 is rotated in the tightening direction, the press-fitting member 3 is displaced in the P arrow-marked direction so that the outer peripheral surface of the press-fitting portion 3 is thrusted against the tapered hole 6b of the chucking device by the wedging action, causing the diameter of the press-fitting portion to be reduced, whereby the inner peripheral surface 3b of the press-fitting portion 3 firmly holds a shank of the cutting tool 7 in the tightened state.

With the conventional chucking device 1 as mentioned above, however, since the foremost end part of the press-fitting portion 3 is offset from the inside tapered surface of the main body 2, the offset part of the press-fitting member 3 does not sufficiently exhibit the wedging effect, resulting in a magnitude of tightening force effective for the cutting tool 7 becoming short. Thus, there arises a problem that the cutting tool is vibratively displaced during a cutting operation.

Therefore, an object of the present invention is to provide a chucking device which assures that a shank portion of a cutting tool can firmly be held in the tightened state over the whole range of a press-fitting member.

SUMMARY OF THE INVENTION

Specifically, according to the present invention, a chucking device is characterized in that it comprises a holder capable of being fitted into a rotation shaft of a machine tool; chucking barrel including on the connection surface side a plurality of axially extending projections located in the equally spaced relationship as viewed in the circumferential direction, a plurality of opening portions each formed between adjacent projections and a tapered hole formed therein; an axially displaceable driving annular member having a plurality of radially extending tooth-like projec- It is preferable that the press-fitting member has a plurality of slits formed through the peripheral wall thereof so as to allow it to have flexibility.

A plurality of axially extending grooves are formed on the inner peripheral surface of the chucking barrel, and a plurality of axially extending grooves are formed on the outer peripheral surface of the press-fitting member at the positions corresponding to the axially extending grooves of the chucking barrel so that a number of rolling members are received between both the axially extending grooves.

It is preferable that the rolling members are balls.

It is preferable that the rolling members are rollers.

According to the present invention, since the driving annular member is displaced in the axial direction as the press-fitting ring is rotated, a shank of the cutting tool can firmly be held in the tightened state over the whole range of the inner hole of the press-fitting member.

In addition, in the case that rolling members are interposed between the chucking barrel and the press-fitting member, the press-fitting member can smoothly be displaced in the axial direction, and strong tightening can be achieved with the press-fitting member.

BEST MODE FOR CARRYING OUT THE INVENTION

Figure 1:
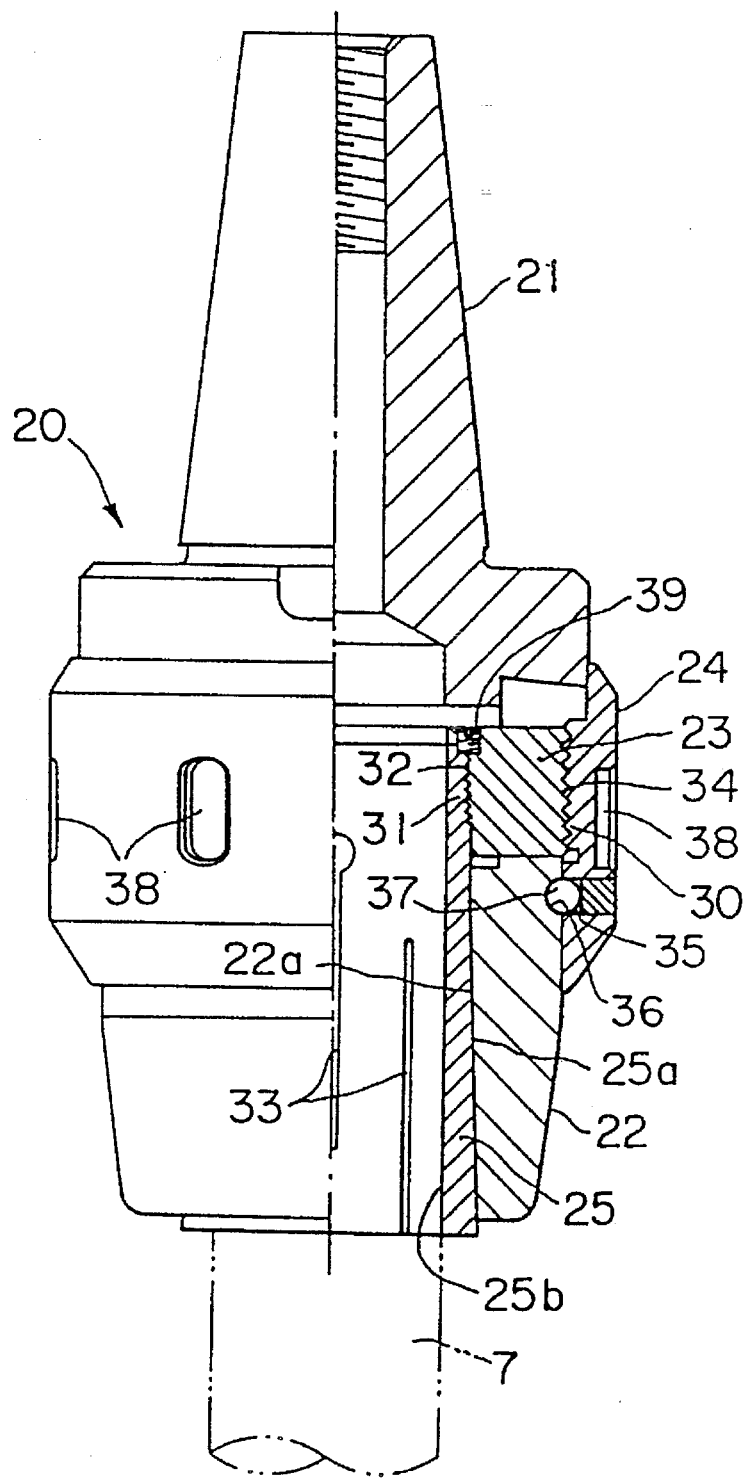
FIG. 1 is a half sectional side view which shows a chucking device constructed in accordance with an embodiment of the present invention.
Figure 2:
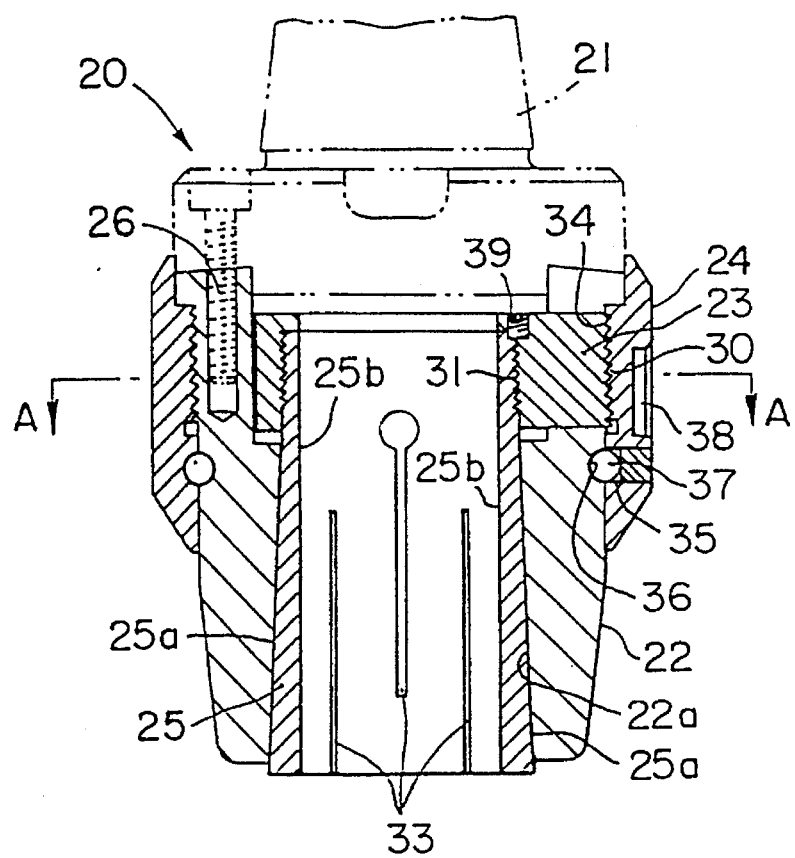
FIG. 2 is a sectional side view of the chucking device, showing essential components constituting the chucking device.

A chucking device constructed in accordance with an embodiment of the present invention will be described below with reference to FIG. 1 to FIG. 3.

The chucking device 20 consists of a holder 21 capable of being fitted into a rotation spindle of a machine tool, a chucking barrel 22 to be connected to the foremost end side of the holder 21, a driving annular member 23, a tightening ring 24, and a cylindrical press-fitting member 25. A tapered hole 22a whose inner diameter is enlarged toward the foremost end thereof is formed inside of the chucking barrel 22. As is apparent from FIGS. 2 and 3, eight projections 27, 27, —17 are formed at the upper end of the chucking barrel 22 in an equally spaced relationship as viewed in the circumferential direction while projecting in the axial direction, and a bolt 26 is threadably fitted to each projection 27 from the holder side. Eight opening portions 28 in total are formed between adjacent projections 27.

Figure 3:
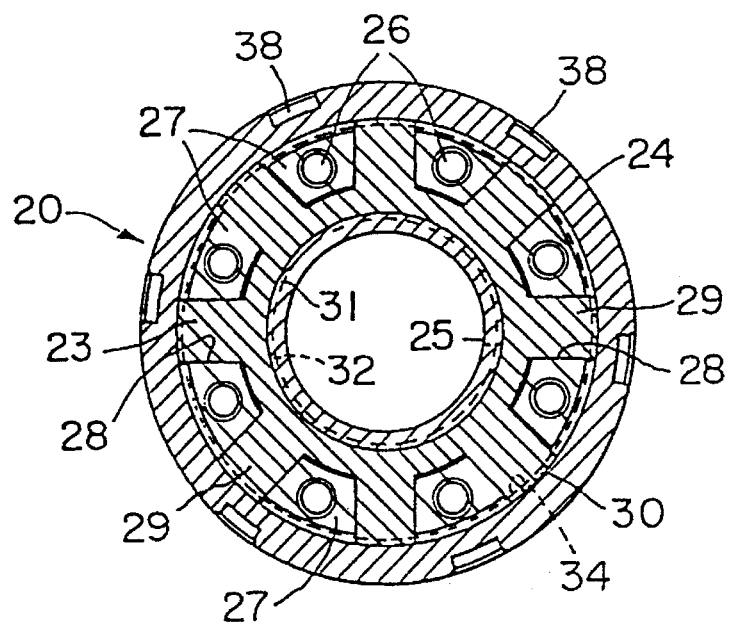
FIG. 3 is a cross-sectional view of the chucking device taken along line A—A in FIG. 2.

As shown in FIG. 3, the driving annular member 23 includes eight tooth-like projections 29 each projecting in the radial direction, and these tooth-like projections 29 are received in the opening portions 28 formed at the upper end of the chucking barrel 22. A plurality of male threads 30 are formed on the outer peripheral surface of the teeth-like projections 29, while a plurality of female threads 31 are formed on the inner hole surface of the driving annular member 23. The female threads 31 are threadably engaged with a plurality of male threads 32 formed on the outer peripheral surface of the press-fitting member 25. The press-fitting member 25 includes an outer surface 25a adapted to come in surface contact with a tapered hole 22a and a straight hole 25b adapted to come in surface contact with a shank of a cutting tool 7. Thus, the press fitting member 25 is dimensioned to have a thickness which gradually increases from the upper end to the lower end thereof. In addition, a plurality of slits 33 are formed through the peripheral wall of the press fitting member 25 in order to facilitate deforming of the press-fitting member 25.

On the other hand, a plurality of female threads 34 to be threadably engaged with the male threads 30 of the driving annular member 23 are formed on the inner peripheral surface of the tightening ring 24. A ball groove 35 extending in the circumferential direction is formed on the inner peripheral surface of the tightening ring 24 in the vicinity of the thread 34. In addition, a plurality of recesses 36 are formed on the outer peripheral surface of the chucking barrel 22 so that balls 37 are received in the recesses 36. Thus, the tightening ring 24 can smoothly be rotated without any displacement thereof in the axial direction. A plurality of spanner engaging slot 38 are formed on the outer peripheral surface of the tightening ring 24.

Next, the operation of the aforementioned chucking device 20 will be described below.

When the tightening ring 24 is rotated, the driving annular ring 23 whose male threads 30 are threadably engaged with the female threads 34 of the tightening ring 24 is axially displaced in the upward direction, causing the cylindrical press-fitting member 25 fixedly secured to the driving annular member 23 to be lifted up along the tapered hole 22a of the chucking barrel 22. Here, since the tapered hole 22a is dimensioned to have a diameter which is reduced toward the rear side, the diameter of the press fitting member 25 is reduced, whereby the shank of the cutting tool 7 is firmly held in the tightened state by the chucking device 20.

FIG. 4 to FIG. 8 show another embodiment of the chucking device 20 of the present invention, and only the differences from the chucking device 20 shown in FIG. 1 to FIG. 3 will be described below.

Figure 4:
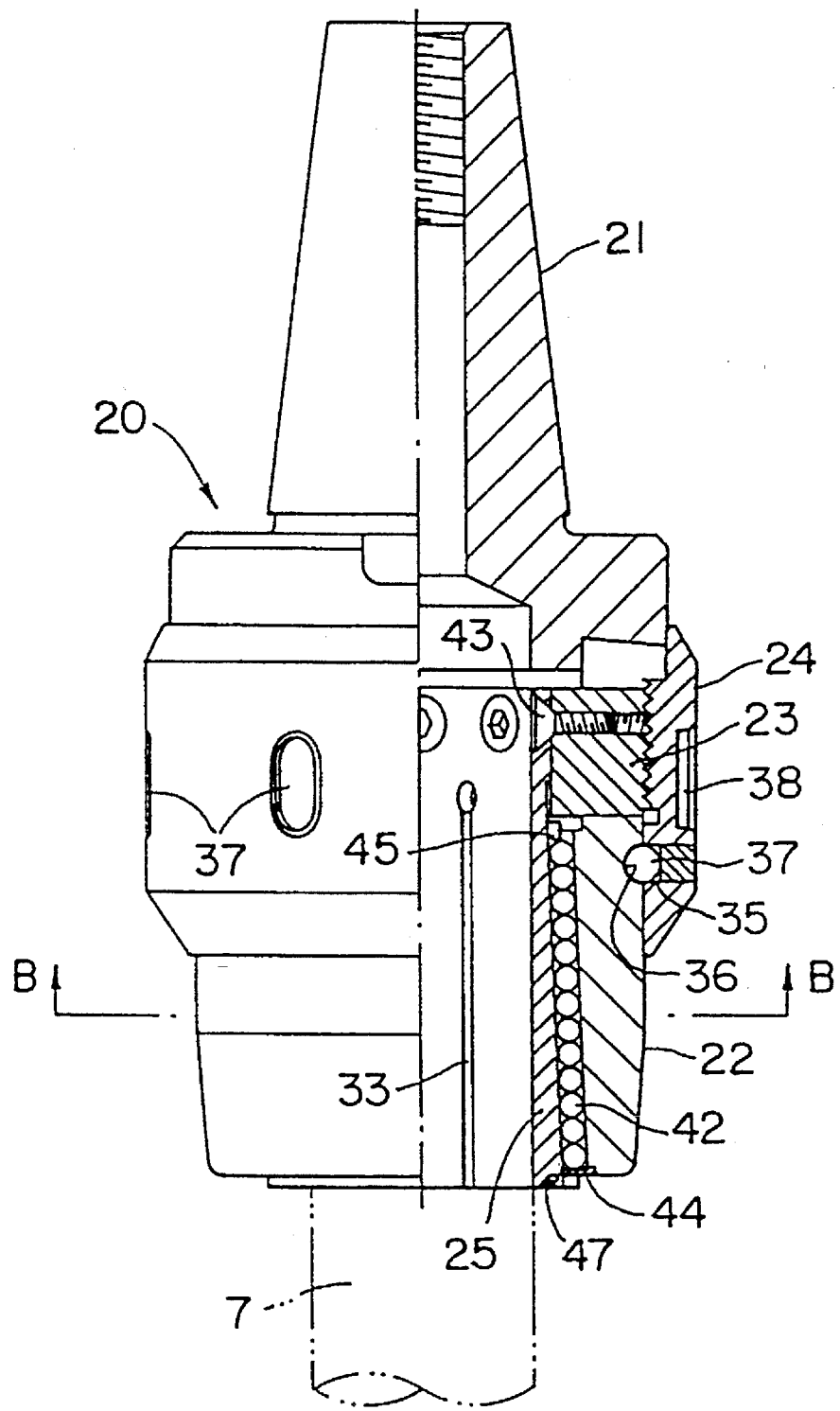
FIG. 4 is a half exploded sectional side view which shows a chucking device constructed in accordance with another embodiment of the present invention.
Figure 5:
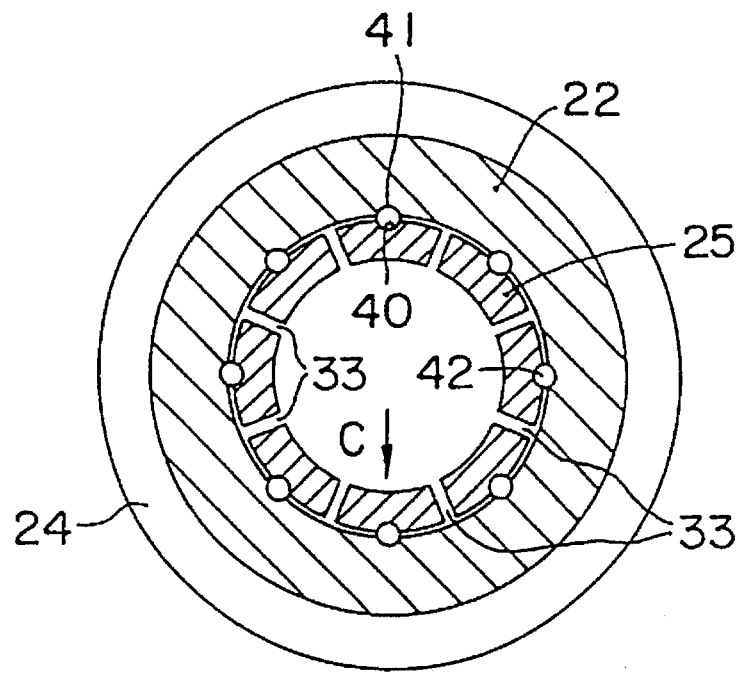
FIG. 5 is a cross-sectional view of the chucking device taken along line B—B in FIG. 4.
Figure 6:
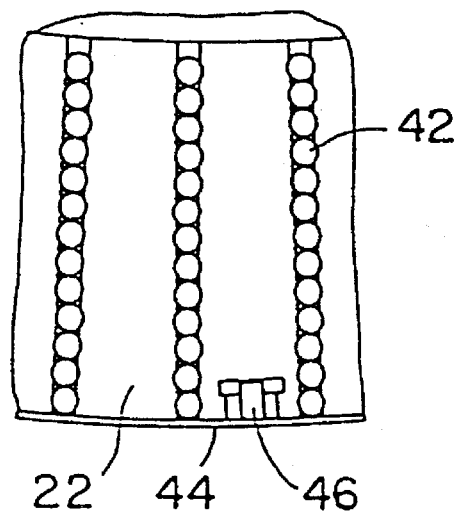
FIG. 6 is a side view which shows the arrangement of balls as viewed in the C arrow-marked direction in FIG. 5.

In this embodiment, the press-fitting member 25 is divided into plural segments (eight segments in this embodiment) each whose extends in the axial direction, and an axially extending ball groove 40 is formed on the outer peripheral surface of each segment. On the other hand, a plurality of ball grooves 41 are formed on the inner hole surface of the chucking barrel 22 corresponding to the ball grooves 40, and a number of balls 42 are received between the ball grooves 40 and the ball grooves 41. As shown in FIG. 4, the press-fitting member 25 and the driving annular member 23 are fixedly secured to each other by screws 43. Reference numerals 44 and 45 denote upper and lower ball retaining plates. Reference numeral 46 denotes a fitting portion where the ball retaining plate 44 is secured to the press-fitting portion 25. In addition, reference numeral 47 denotes an excessive contraction preventing ring for preventing the foremost end of the press-fitting member 25 from being damaged while the cutting tool 7 is disengaged from the chucking device.

According to such embodiment, since balls 42 are disposed between the chucking barrel 22 and the press-fitting member 25, displacement of the press-fitting member 25 can more smoothly be achieved.

Figure 7:
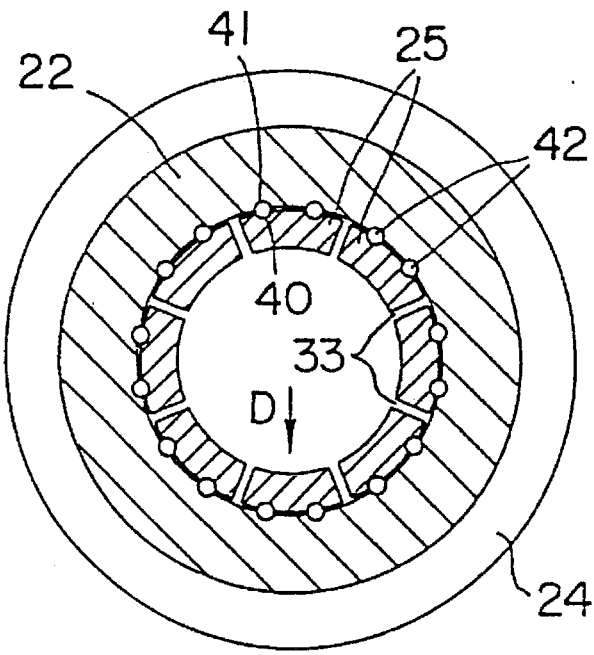
FIG. 7 is a cross-sectional view of a chucking device constructed in accordance with another embodiment of the present invention, showing the arrangement of balls.
Figure 8:
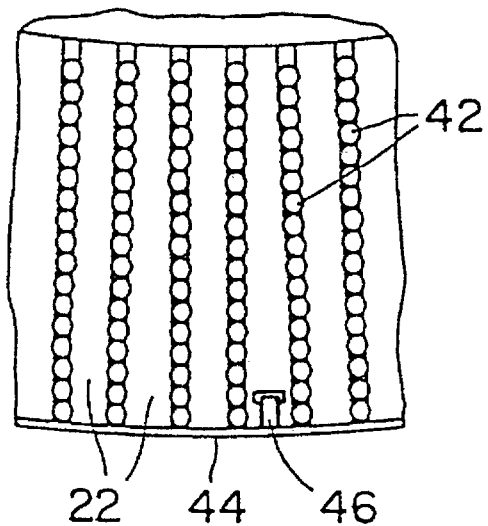
FIG. 8 is a side view of the chucking device, showing the arrangement of balls as viewed in the D arrow-marked direction in FIG. 7.

An embodiment shown in FIG. 7 and FIG. 8 shows an arrangement in which a single press fitting member 25 is divided into a plurality of segments by slits 33 and two axially extending ball grooves 40 are formed on the outer peripheral surface of each segment so that balls 42 are received in these ball grooves 40.

According to such embodiment, the chucking device can sufficiently cope with firm holding of a large diameter cutting tool for which a high intensity of tightening force is required.

Figure 9:
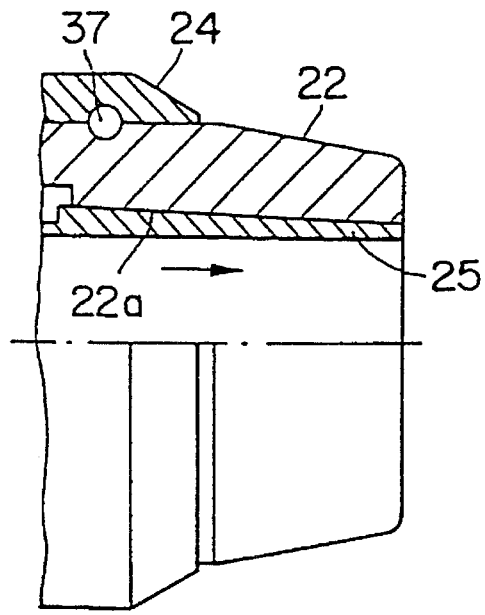
FIG. 9 is a sectional side view of a chucking device constructed in accordance with another embodiment of the present invention.

To the embodiment shown in FIG. 9 the tapered hole 22a of a chucking barrel 22 and the taper on the outer peripheral surface of the press fitting member 25 corresponding to the tapered hole 22a are different from those in the preceding embodiment, and the tapered hole 22a is dimensioned to have a diameter which is reversely reduced toward to the foremost end thereof. According to such embodiment, when the press-fitting member 25 is lowered, a high intensity of tightening force is exerted on the shank of cutting tool 7.

Figure 10:
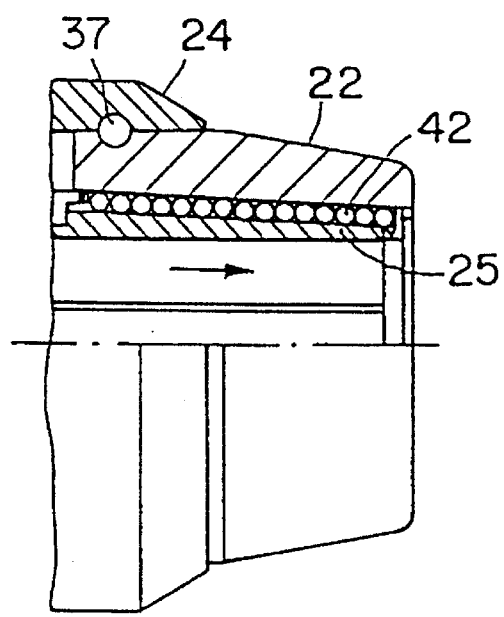
FIG. 10 is a sectional side view of a chucking device constructed in accordance with still another embodiment of the present invention.

FIG. 10 shows an example in which a number of balls are received between the chucking barrel 22 and the press fitting member 25 in addition to the embodiment shown in FIG. 9.

Figure 11:
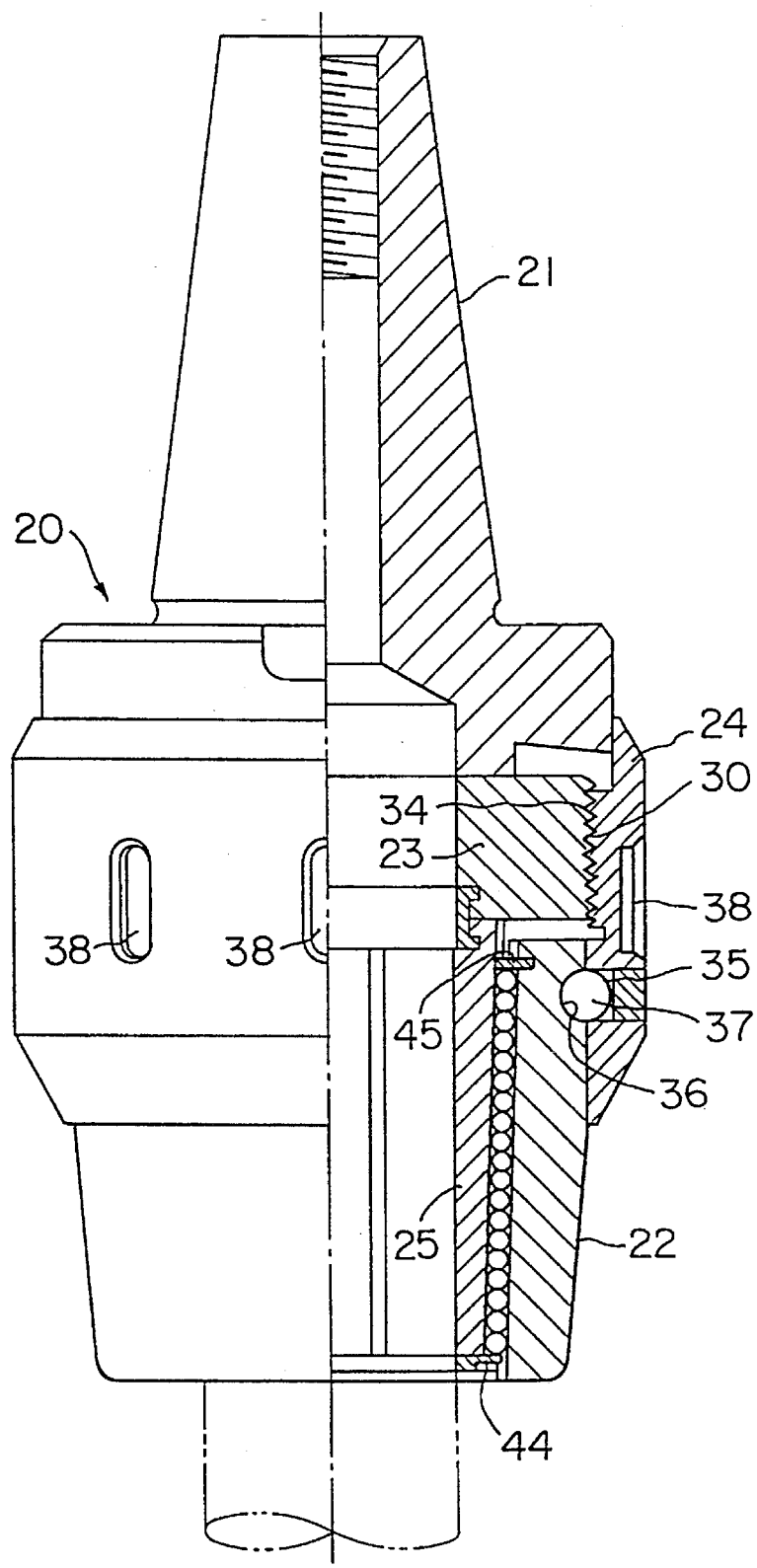
FIG. 11 is a half sectional side view of a chucking device constructed in accordance with another embodiment of the present invention.
Figure 12:
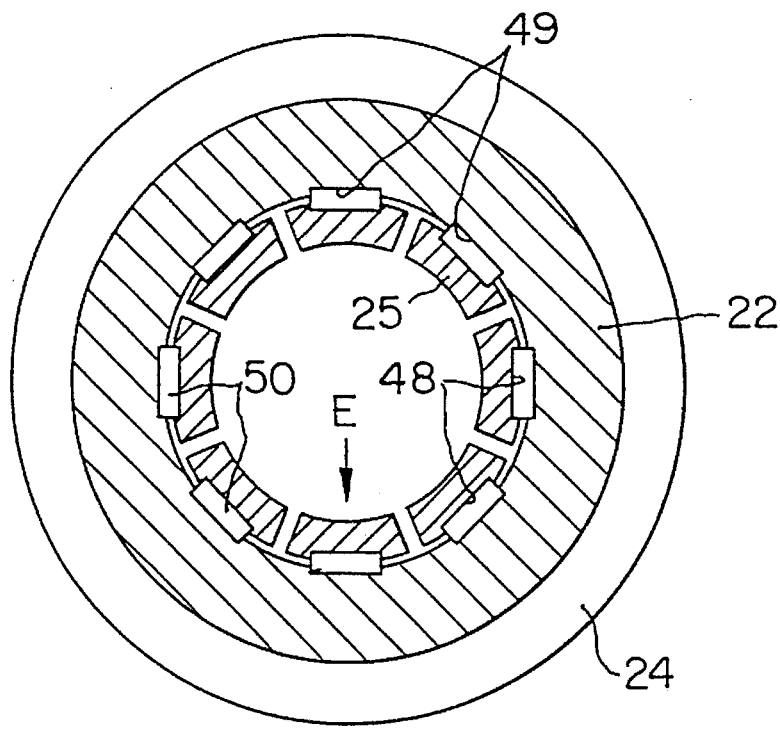
FIG. 12 is a cross-sectional view of the chucking device taken along line E—E in FIG. 11.
Figure 13:
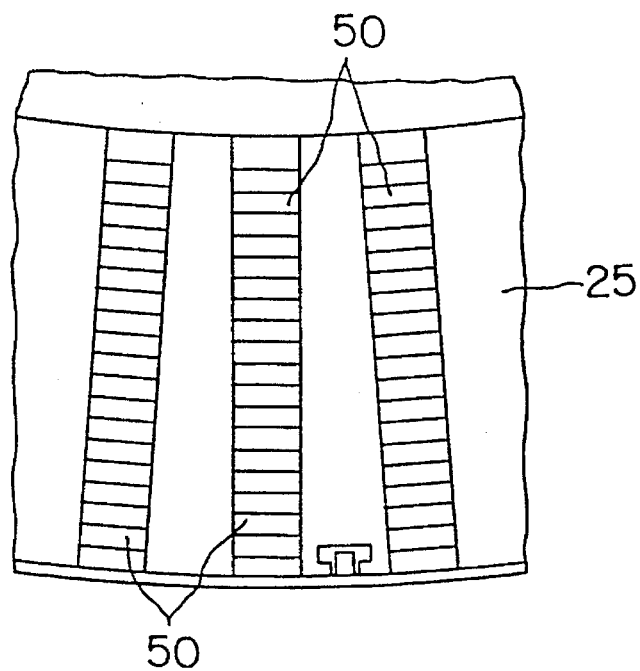
FIG. 13 is a side view of the chucking device as viewed in the F arrow-marked direction in FIG. 12.
Figure 14:
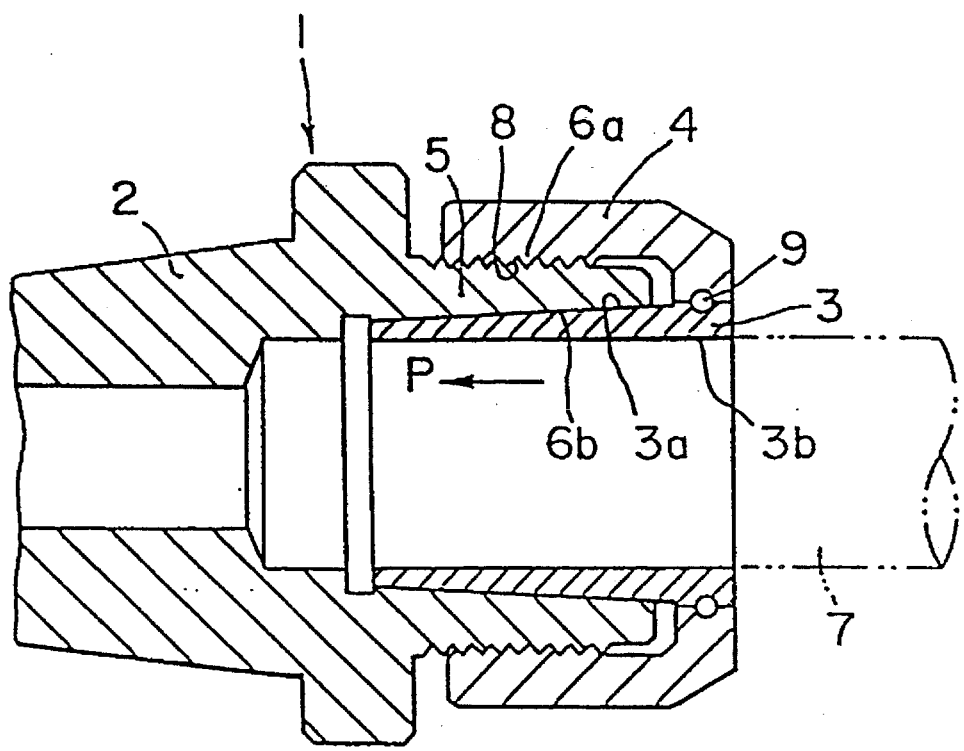
FIG. 14 is a sectional side view of a conventional chucking device.

In the aforementioned embodiment, balls 42 are received between the chucking barrel 22 and the press fitting member 25. Alternatively, rollers may be substituted for the balls. FIG. 11 to FIG. 13 show this embodiment, respectively.

Specifically, a plurality of axially extending grooves 48 each having a rectangular sectional shape are formed on the rear surfaces of segments of chucking barrel divided into eight segments by slits 33. On the other hand, a plurality of axially extending grooves 49 each having a rectangular sectional shape are formed on the inside of the chucking barrel 22, and a number of rollers 50 ate received between the grooves 48 and the grooves 49. According to such embodiment, the chucking device can sufficiently cope with firm holding of a cutting tool even in the case when the shank of the cutting tool has a large diameter and a large magnitude of torque is exerted on the cutting tool.

What is claimed is:

1. A chucking device comprising a holder capable of being fitted in a rotation spindle of a machine tool; a chucking barrel including on a connection surface side a plurality of axially extending projections located in an equally spaced relationship as viewed in the circumferential direction, a plurality of opening portions each formed between adjacent projections and a tapered hole formed therein; an axially displaceable, hollow, annular driving member having a plurality of radially extending, circumferentially spaced, tooth-like projections fitted into said opening portions of said chucking barrel and having a plurality of male threads formed on an outer peripheral surface thereof; a tightening ring having a plurality of female threads threadably engageable with said male threads of said driving annular member formed on an inner hole surface thereof, said tightening ring being rotatably held on an outer peripheral surface of said chucking barrel; and a press-fitting member fixedly secured to said driving annular member and adapted to be fitted into said tapered hole of said chucking barrel.

2. A chucking device as claimed in claim 1, wherein said press fitting member has a plurality of slits formed through a peripheral wall thereof so as to allow it to have flexibility.

3. A chucking device as claimed in claim 1, wherein a plurality of axially extending grooves are formed on an inner peripheral surface of said chucking barrel, and a plurality of axially extending grooves are formed on an outer peripheral surface of said press-fitting member at positions corresponding to said axially extending grooves of said chucking barrel, and a number of rolling members are received between both the axially extending grooves.

4. A chucking device as claimed in claim 3, wherein said rolling members are balls.

5. A chucking device as claimed in claim 3, wherein said rolling members are rollers.

6. A chucking device as claimed in claim 1, comprising attachment means securing said chucking barrel in said holder and including axially extending bolts threadably engaged in said projections of said chucking barrel.

7. A chucking device as claimed in claim 1, wherein said driving annular member encircles said press-fitting member so that a central hole in the press-fitting member is unobstructed and is axially open through the entire press-fitting member.

8. A chucking device as claimed in claim 7, wherein said press-fitting member has a smooth, non-threaded inner surface surrounding said central hole.

9. A chucking device as claimed in claim 1, wherein said annular driving member has an inner surface threadably engaged with said press-fitting member.

10. A chucking device as claimed in claim 1, wherein said axially extending projections of said chucking barrel extend completely through said hollow, annular driving member in spaces formed between said tooth-like projections thereof.

* * * * *